(12) United States Patent
Tan

(10) Patent No.: US 9,190,021 B2
(45) Date of Patent: Nov. 17, 2015

(54) VISUAL FEEDBACK DURING REMOTE COLLABORATION

(75) Inventor: Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 147 days.

(21) Appl. No.: 13/454,869

(22) Filed: Apr. 24, 2012

(65) Prior Publication Data

US 2013/0278629 A1    Oct. 24, 2013

(51) Int. Cl.
*G09G 5/14*    (2006.01)
*G06F 3/14*    (2006.01)
*H04N 7/14*    (2006.01)

(52) U.S. Cl.
CPC .............. *G09G 5/14* (2013.01); *G06F 3/1454* (2013.01); *H04N 7/147* (2013.01); *G09G 2340/10* (2013.01)

(58) Field of Classification Search
CPC ....... G09G 5/00; G09G 5/14; G09G 2340/10; G05B 2219/33298; H04N 7/15; H04N 7/147; G06F 7/147
USPC .................................................. 345/629, 592
See application file for complete search history.

(56) References Cited

U.S. PATENT DOCUMENTS

| 4,602,286 | A | * | 7/1986 | Kellar et al. | 348/597 |
|---|---|---|---|---|---|
| 4,684,990 | A | * | 8/1987 | Oxley | 348/585 |
| 4,758,892 | A | * | 7/1988 | Bloomfield | 348/585 |
| 5,400,069 | A |   | 3/1995 | Braun et al. | |
| 5,612,734 | A |   | 3/1997 | Nelson et al. | |
| 5,754,180 | A | * | 5/1998 | Kivolowitz et al. | 345/418 |
| 6,208,373 | B1 |   | 3/2001 | Fong et al. | |
| 7,808,540 | B2 |   | 10/2010 | Cok | |
| 8,035,653 | B2 | * | 10/2011 | Tsai | 345/592 |
| 8,063,929 | B2 |   | 11/2011 | Kurtz et al. | |
| 8,421,800 | B2 | * | 4/2013 | Buchanan et al. | 345/420 |
| 2005/0273700 | A1 | * | 12/2005 | Champion et al. | 715/512 |
| 2007/0064112 | A1 | * | 3/2007 | Chatting et al. | 348/207.99 |
| 2008/0068446 | A1 | * | 3/2008 | Barkley et al. | 348/14.07 |
| 2008/0165267 | A1 |   | 7/2008 | Cok | |
| 2008/0297586 | A1 |   | 12/2008 | Kurtz et al. | |
| 2008/0297588 | A1 |   | 12/2008 | Kurtz et al. | |

(Continued)

FOREIGN PATENT DOCUMENTS

WO    WO 2010120303 A2 * 10/2010
WO    WO 2010120304 A2 * 10/2010

OTHER PUBLICATIONS

Stotts et al, FaceSpace: Endo- and Ex-Spatial Hypermedia in the Transparent Video Facetop, Aug. 9-13, 2004, ACM, pp. 48-57.*

(Continued)

*Primary Examiner* — Stephen R Koziol
*Assistant Examiner* — Brian Kravitz
(74) *Attorney, Agent, or Firm* — Dierker & Associates P.C.

(57) ABSTRACT

Visual feedback is provided to a local user of a remote collaboration system. While an image is being captured, it is recognized that content is being shared on a screen. A composite image is generated which includes a form of the image being captured and the shared content. The composite image is caused to be displayed on a remote screen. A variably semi-transparent image of at least a portion of the composite image or the image is generated and is rendered on a portion of the screen such that the variably semi-transparent image is overlaid on any of the shared content or another composite image displayed on the screen.

20 Claims, 5 Drawing Sheets

(56) References Cited

U.S. PATENT DOCUMENTS

| | | | |
|---|---|---|---|
| 2008/0303949 A1* | 12/2008 | Ciudad et al. | 348/586 |
| 2009/0199078 A1* | 8/2009 | Caspi et al. | 715/202 |
| 2010/0058201 A1* | 3/2010 | Harvey et al. | 715/753 |
| 2010/0207874 A1 | 8/2010 | Yuxin et al. | |
| 2011/0154244 A1* | 6/2011 | Howell et al. | 715/772 |
| 2011/0171612 A1* | 7/2011 | Gelinske et al. | 434/35 |
| 2011/0225542 A1* | 9/2011 | Schmieder et al. | 715/794 |
| 2011/0292255 A1 | 12/2011 | Kanade et al. | |
| 2012/0016960 A1* | 1/2012 | Gelb et al. | 709/217 |
| 2012/0026274 A1 | 2/2012 | Baker et al. | |
| 2012/0026275 A1* | 2/2012 | Robinson et al. | 348/14.03 |
| 2012/0038742 A1* | 2/2012 | Robinson et al. | 348/14.16 |
| 2012/0066722 A1 | 3/2012 | Cheung et al. | |
| 2012/0081611 A1* | 4/2012 | Tan et al. | 348/584 |
| 2012/0110516 A1* | 5/2012 | Tumanov | 715/863 |
| 2012/0113008 A1* | 5/2012 | Makinen et al. | 345/168 |
| 2012/0274727 A1* | 11/2012 | Robinson et al. | 348/14.07 |
| 2012/0284646 A1* | 11/2012 | Sitrick et al. | 715/753 |
| 2013/0215292 A1* | 8/2013 | Reichelt | 348/239 |

OTHER PUBLICATIONS

WebEx, Benefits of WebEx, Jul. 13, 2011, https://web.archive.org/web/20110713070910/http://www.webex.com.au/overview/web-conferencing.html, pp. 1.*

Nescher et al., "An interactive Whiteboard for Imersive Telecollaboration", Published Online Feb. 9, 2011, 10 pages.

Tan et al,, "Enabling Genuine Eye Contact and Accurate Gaze in Remove Collaboration", Presented at IEEE international Conference on Muitimedia and Expo, Jul. 19, 2010, pp. 430-435.

Zhang et al. "A Novel See-Through Screen Based on Weave Fabrics", 6 pages, IEEE International Conference onMultimedia and Expo (ICME), 2011, pp. 1-6.

Alpha Compositing, Wikipedia, 6 pages, accessed Mar. 1, 2012.

* cited by examiner

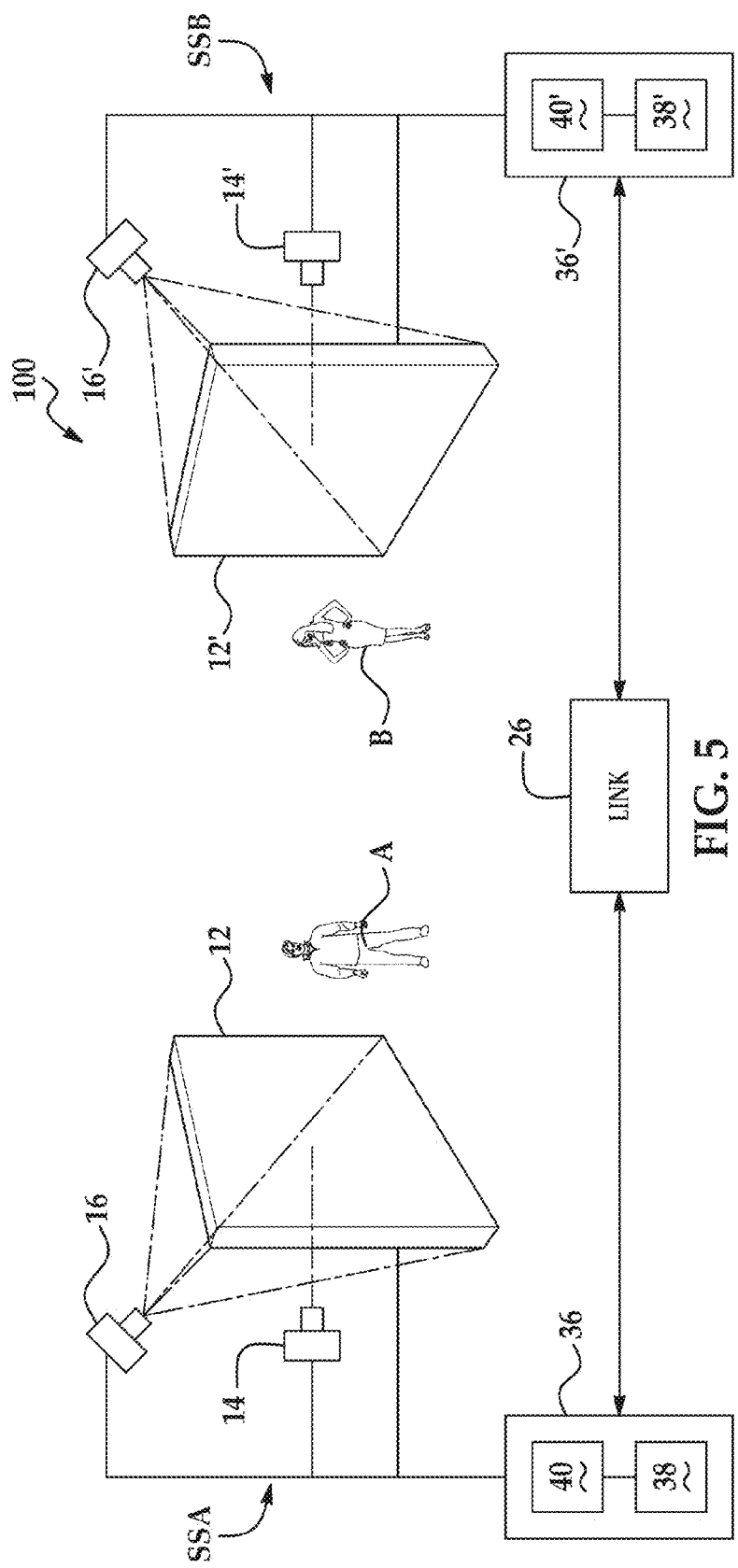

VISUAL FEEDBACK DURING REMOTE COLLABORATION

BACKGROUND

Remote collaboration or telepresence systems allow users who are in different locations to see and talk to one another, creating the illusion that the participants are in the same room. These systems include technology for the reception and transmission of audio-video signals so that the remotely located participants are able to communicate in real-time or without noticeable delay. Some systems also include on-screen drawing capabilities and content sharing capabilities. The visual aspect of telepresence systems enhances remote communications by allowing the users to perceive one another as well as any shared content.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 5 is a semi-schematic view of an example of a remote collaboration system where an image processing system is part of the local system and the remote system;

FIG. 6 is a schematic depiction of an example of the image processing system used in FIG. 5.

DETAILED DESCRIPTION

The present disclosure relates generally to visual feedback during remote collaboration. Examples of the method, computer readable medium, and system disclosed herein are used to provide visual feedback to a local user of a remote collaboration system. The system disclosed herein includes a screen, through which or in front of which images are captured, and on which other images and content may be shared. The system disclosed herein includes an image processing system which is capable of providing visual feedback to the local user. The visual feedback is provided in the form of a variably semi-transparent image that is overlaid on the shared content and/or images being displayed on the user's local screen. The variably semi-transparent image indicates to the local user how his/her image, including any shared content, appears to the remote user. As such, the variably semi-transparent image may be an indication to the local user that the shared content is occluding his/her image.

Figure 1:
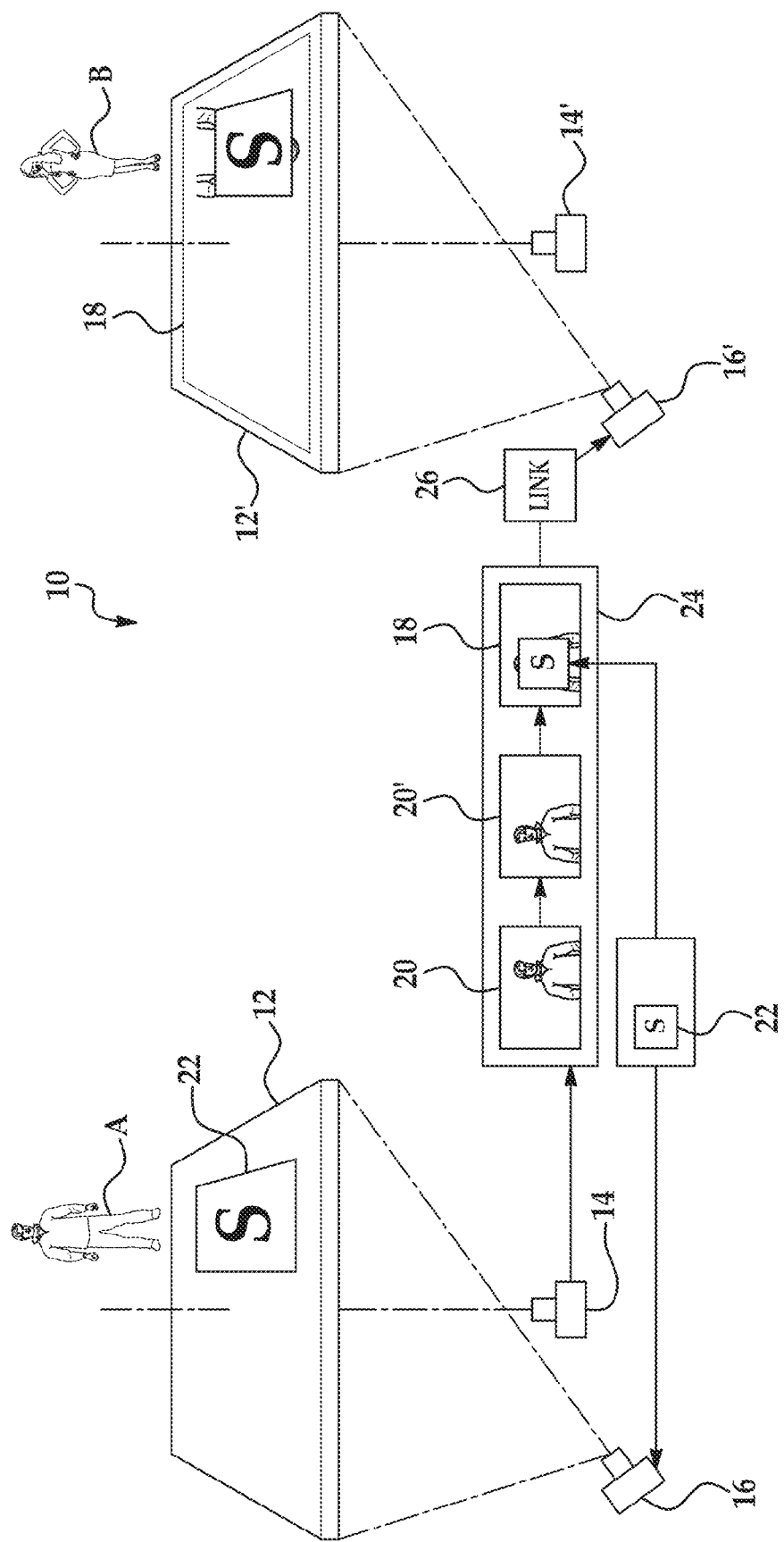
FIG. 1 is a schematic view of an example of a remote collaboration system.
Figure 2:
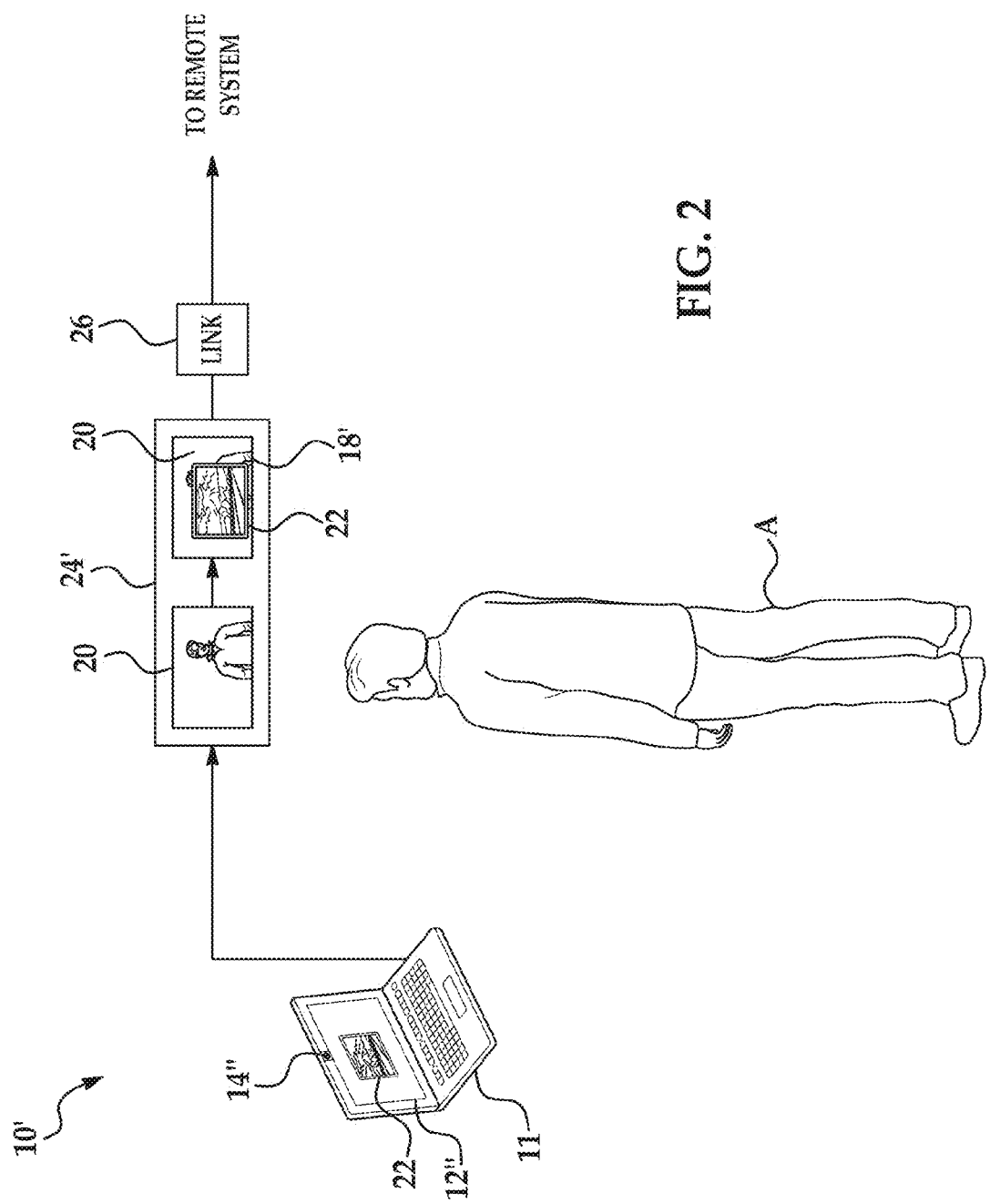
FIG. 2 is a schematic view of another example of a remote collaboration system.

It is to be understood that the examples of the image processing system disclosed herein may be utilized with any hardware and programming combination. The hardware includes at least a computing system operatively connected to a display system. Examples of suitable display systems include electronic visual display-based systems, projection-based displays, etc. Screens of electronic visual display-based systems or projection-based displays may be non-see-through screens, where an imaging device is positioned within the screen or around the screen to capture images in front of the screen. Screens of other projection-based displays may be see-through screens, where an imaging device is positioned behind the screen to capture images in front of the screen. FIG. 1 illustrates an example of a remote collaboration system including a projector-based display with a see-through screen, and FIG. 2 illustrates an example of a local system of a remote collaboration system including an electronic visual display with a non-see-through screen.

Referring now to FIG. 1, an example of a remote collaboration system 10 is depicted. In this description, user A is considered to be a local user and user B is considered to be a remote user. With this in mind, the remote collaboration system 10 includes a local screen 12 (which in this example is a see-through screen), a local imaging device 14, a local projector 16, a remote screen 12', a remote imaging device 14', and a remote projector 16'. While the components 12, 14, and 16 are referred to as local components, it is to be understood that these components may be considered remote components when the system 10 is described from the view point of user B. In these instances, user B and his/her system components, e.g., 12', 14' and 16', would be considered to be local components, and user A and his/her system components, e.g., 12, 14, 16, would be considered to be remote components.

The see-through screens 12, 12' shown in this example allow an imaging device (e.g., 14, 14') to be positioned behind the screen 12, 12', which enables local user(s) to look at the remote user's image that is displayed on the screen 12, 12' while also looking into the imaging device 14, 14'. Each of the see-through screens 12, 12' may be any display screen that is capable of having images and content displayed thereon, and having images captured therethrough. The local and remote see-through screens 12, 12' may be based upon half-silvered mirrors, variations of the half-silvered mirror (e.g., including a polarizing film sandwiched between the screen and the half mirror), switchable liquid crystal diffusers, holographic projection screens that diffuse light from pre-specified angles and otherwise allow light to pass through, or screens using weave fabrics. In an example, screens that diffuse light from pre-specified angles may be coupled with various techniques (e.g., temporal multiplexing or wavelength multiplexing) to separate light from projected images and content from light captured through the screen by the imaging device 14, 14'. Temporal multiplexing involves alternating projecting images and content with capturing images. Wavelength multiplexing involves using different, non-overlapping sets of wavelengths for projection and capture. As such, if the projector 16 or 16' outputs light in spectral range(s) that do not overlap the spectral range(s) observable by the respective imaging device 14 or 14', the respective imaging device 14 or 14' will not sense the backscattered light emitted from the projector 16 or 16'. In this example, interference filters may be arranged to further reduce backscatter.

In the example shown in FIG. 1, the imaging devices 14, 14' are placed behind the respective see-through screens 12, 12' in order to capture images through the respective see-through screen 12, 12'. It is to be understood that the imaging devices 14, 14' do not capture the content 22 that may be shared on the screen 12, 12'. An example of a suitable imaging device 14, 14' includes a camera that is capable of taking video images (i.e., a series of sequential video frames that capture motion) at any desired frame rate, and/or is capable of taking still images.

As noted above, the example shown in FIG. 1 is a projection-based system. The projectors 16, 16' are also placed behind the respective see-through screens 12, 12' in order to project images and/or content thereon. The position of the projectors 16, 16' will depend, at least in part, on the type of see-through screen that is utilized.

A compositing engine 24 is included in the system 10. The compositing engine 24 may be any combination of hardware and programming that is capable of creating a composite image 18 using images taken by the imaging device 14 or 14' and content 22 that is shared on the screen 12 or 12'. In the example shown in FIG. 1, the composite engine 24 receives an image 20 taken by the imaging device 14. As depicted, the image 20 is of user A and any background surrounding him/her that is within the imaging device's field of view. In this example, the composite engine 24 then mirrors the image. The mirrored image is shown at reference numeral 20'. The composite engine 24 also recognizes that content 22 is being displayed on the screen 12 and receives or retrieves such content 22 from the memory that stores the content 22. The compositing engine 24 then composites the mirrored image 20' and the content 22 to generate the composite image 18.

In the examples disclosed herein, the content 22 may be any media, including, for example, documents, digital photographs, slides, spreadsheets, etc. The content 22 may be retrieved from any memory that is capable of storing the content 22 and that can be accessed by a computing device that is operatively connected to the screen 12, 12' or that is in operative connection with the projector 16. The computing device will be discussed further in reference to FIGS. 5-7. In order to retrieve and display content 22, the user A may utilize an input device (e.g., keyboard, mouse, touch screen, etc., which are not shown) operatively connected to the computing device to request that the content 22 be shared.

The composite image 18 is sent from the compositing engine 24 to the projector 16' through a link 26. The link 26 may be one or more of cable, wireless, fiber optic, or remote connections via a telecommunication link, an infrared link, a radio frequency link, or any other connectors or systems that provide electronic communication. Link 26 may include, at least in part, an intranet, the Internet, or a combination of both. The link 26 may also include intermediate proxies, routers, switches, load balancers, and the like. The projector 16' displays the received composite image 18 on the remote see-through screen 12'.

While not shown in FIG. 1, it is to be understood that composite images may also be generated from images taken by imaging device 14' and content that is shared on the see-through screen 12'. These composite images would be transmitted to see-through screen 12 in the reverse path of that shown in FIG. 1. For example, the image of user B and the surrounding background would be mirrored and transmitted to be displayed with any shared content on screen 12.

Figure 3:
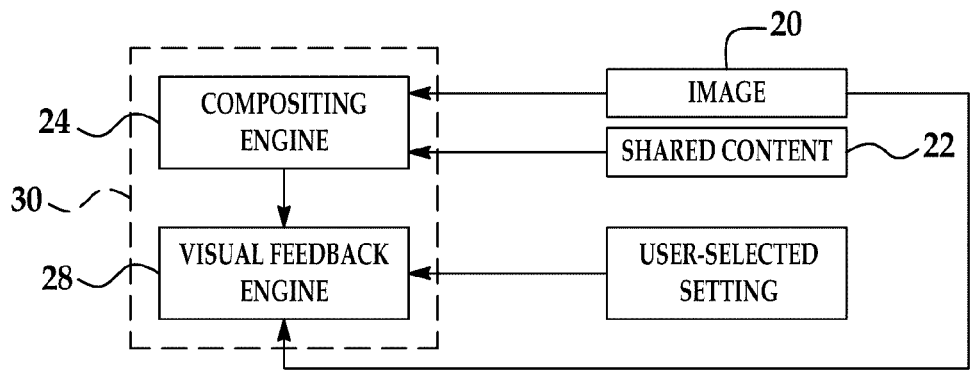
FIG. 3 is a schematic view of an example of an image processing system including a compositing engine and a visual feedback engine.

In the example shown in FIG. 1, the shared content 22 is blocking at least part of user A in the composite image 18. As depicted in FIG. 1, user B cannot see all of user A on the screen 12' because of the positioning of the shared content 22. When user A is sharing content 22 in this manner, he/she may not be aware that the shared content 22 is blocking his/her image. A visual feedback engine, shown at reference numeral 28 in FIG. 3, is included as part of the system 10 in order to provide visual feedback to any local user so that he/she is made aware when the content 22 he/she is sharing is occluding any object within the composite image 18.

Referring now to FIG. 2, another example of a portion of a remote collaboration system 10' is depicted. In this description, the local user A and his local system are shown. The local system includes a laptop computer 11 (or another computing device, such as a desktop computer), which includes a non-see-through screen 12" and the imaging device 14" built into the laptop computer 11.

The non-see-through screen 12" may be any display screen that is capable of having images and content displayed thereon, but that an imaging device cannot see through. Examples of the non-see-through screen 12" include liquid crystal displays, light-emitting diode displays, organic light-emitting diode displays, etc.

In the example shown in FIG. 2, the imaging device 14" is part of the laptop computer 22 and is positioned over the screen 12" in order to capture images in front of the screen 12". It is to be understood that the imaging device 14" does not capture the content 22 that may be shared on the screen 12". The examples provided above for imaging devices 14 and 14' may also be used for the imaging device 14". In this example, the imaging device 14" may otherwise be a webcam that is operatively connected to the laptop computer 11 and positioned to capture images in front of the screen 12" or in another area.

The system 10' shown in FIG. 2 includes another example of the compositing engine 24'. The compositing engine 24' may be any combination of hardware and programming that is capable of creating a composite image 18' using images taken by the imaging device 14" and content 22 that is shared on the screen 12". As shown in FIG. 2, the composite engine 24' receives an image 20 taken by the imaging device 14". The composite engine 24' recognizes that content 22 is being displayed on the screen 12 and receives or retrieves such content 22 from the memory that stores the content 22. The image 20, which in this example is not mirrored, is composited with any content 22 that is shared on the screen 12" to generate the composite image 18'.

The composite image 18' is sent from the compositing engine 24' to another remote system through the link 26.

In the example shown in FIG. 2, the shared content 22 is blocking at least part of user A in the composite image 18'. In this example, the user of the remote system will not be able to see all of user A on the screen of the remote system because of the positioning of the shared content 22. When user A is sharing content 22 in this manner, he/she may not be aware that the shared content 22 is blocking his/her image. The visual feedback engine, shown at reference numeral 28 in FIG. 3, is included as part of the system 10' in order to provide visual feedback to any local user so that he/she is made aware when the content 22 he/she is sharing is occluding any object within the composite image 18'.

Referring now to FIG. 3, the remote collaboration systems 10 and 10' include one or more image processing engines 30 including the previously described compositing engine 24 or 24' and the previously mentioned visual feedback engine 28. The visual feedback engine 28 may be any combination of hardware and programming that is capable of recognizing that the shared content 22 is occluding an object (e.g., user A) in the composite image 18 or 18', generating a variably semi-transparent image of at least a portion of the image 20 or the composite image 18 or 18', and rendering the variably semitransparent image on a portion of the screen 12, 12". This provides the user A with a visual representation of what is shown to user B.

The visual feedback engine 28 may include programming for visual object recognition or object detection that enables the engine 28 to recognize that the shared content 22 is occluding an object. In some instances, the programming can identify the object.

Figure 4A:
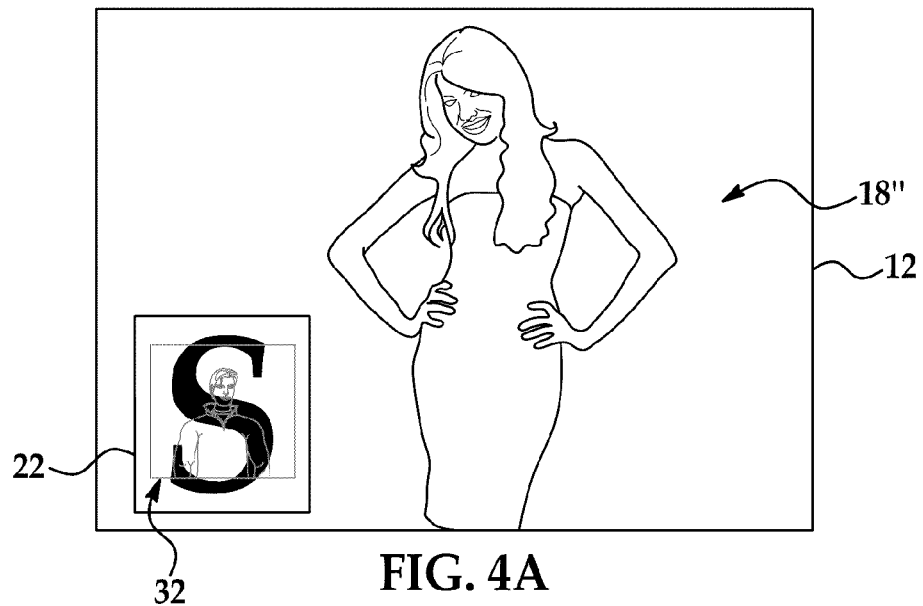
FIG. 4A is a schematic, front view of an example of a local user's see-through screen when a variably semi-transparent image is overlaid on projected content.
Figure 4B:
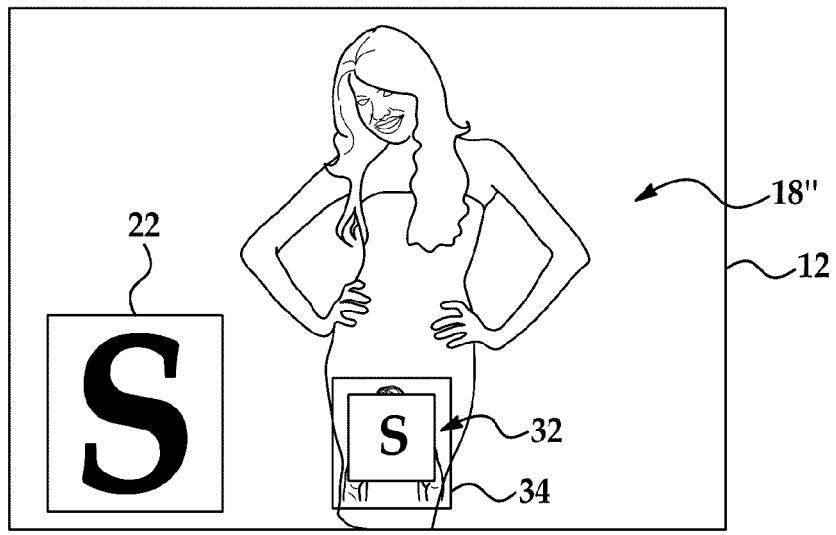
FIG. 4B is a schematic, front view of an example of a local user's see-through screen when a variably semi-transparent image is overlaid on a portion of a composite image displayed on the local user's see-through screen.

Examples of the variably semi-transparent image 32 are shown in FIGS. 4A and 4B, which will be discussed in more detail below. The semi-transparent image 32 may be based on the entire composite image 18 or 18', or on a portion of the image 20, or on the entire image 20. In an example, the visual feedback engine 28 creates the variably semi-transparent image 32 using alpha compositing to combine the composite image 18 or 18' (i.e., the mirrored or original version of image 20 of user A composited with user A's shared content 22) or all or a portion of the image 20 with the background of the screen 12 or 12" to create the appearance of partial or full transparency. In an example, the variably semi-transparent image 32 is a partially transparent or a fully transparent rendition of the composite image 18 or 18' that is overlaid on the image(s) and/or content 22 being displayed on the screen 12 (e.g., a composite image 18" of user B). In another example, the variably semi-transparent image 32 is a partially transparent or a fully transparent rendition of any portion of the image 20 that is being occluded by the content 22, and this portion of the image 20 is overlaid on the content 22 being displayed on the screen 12. In these examples, the image(s) and/or content 22 being displayed on the screen 12 is/are still visible to the local user (e.g., user A).

As an example, the variably semi-transparent image 32 may appear in the foreground while the image(s) and/or content 22 being displayed on the screen 12 appears in the background. This may be accomplished using an "over" compositing operator. As other examples, the compositing operator selected to generate the variably semi-transparent image 32 may be "in," "held out by," "atop," or "xor," or the reverse of any of the operators mentioned herein. If an alpha channel (which stores an alpha or transparency value for each pixel of an image) is used, alpha compositing may involve normal (non-premultiplied) alpha blending or premultiplied alpha blending.

The visual feedback engine 28 may dynamically (i.e., in real-time) and automatically alter the transparency of the variably semi-transparent image 32. The level of transparency may be varied based upon whether or not an object is being occluded by the shared content 22 in the composite image 18 or 18'. Additionally, the level of transparency may be varied based upon what the object is. As an example, when the visual feedback engine 28 detects that the object being occluded is a plant or a chair in the composite image 18 or 18', the level of transparency may be raised to render the variably semi-transparent image 32 less opaque. This type of variably semi-transparent image 32 may provide visual feedback to the local user without rising to the level of an indication that the user is occluding himself or herself. As another example, when the visual feedback engine 28 detects that the object being occluded is one or more persons in the composite image 18 or 18', the visual feedback engine 28 may reduce the level of transparency of the variably semi-transparent image 32. In effect, this reduction in transparency will increase the opacity of the variably semi-transparent image 32 so that the variably semi-transparent image 32 acts as a flash or warning to the local user (e.g., user A in this example) that he/she is occluded himself/herself in the view that the remote user (e.g., user B) is seeing.

The transparency level may also be altered to be higher or lower depending upon how much of the object is being occluded. For example, if the shared content 22 is occluding the user's face, arm(s), or entire body, the level of transparency may be lowered, but if the shared content 22 is occluding the user's leg(s) alone, the level of transparency may be raised. The visual feedback engine 28 may also be configured to decrease the level of transparency whenever any part of a local user is being occluded in the composite image 18 or 18'.

The visual feedback engine 28 may also be capable of receiving or retrieving (e.g., from a memory that the engine 28 has access to) a user-selected setting that indicates a desired transparency level. The local user (e.g., user A) may wish to have the variably semi-transparent image 32 at the lowest possible transparency level regardless of whether an object is being occluded or not. A user may preselect this setting using a computing device in operative connection with the image processing engine 30. The computing device will be discussed further in reference to FIGS. 5-7. In order to set a transparency level setting, the user may utilize an input device (e.g., keyboard, mouse, etc., which are not shown) operatively connected to the computing device.

Since the visual feedback engine 28 is capable of dynamically altering the transparency level of the variably semi-transparent image 32, the visual feedback engine 28 is capable of raising or lowering the level as remote collaboration is taking place. The visual feedback engine 28 is thus capable of being responsive to changes that are made to the composite images 18 or 18' that are generated and transmitted. For example, if at the outset of a remote collaboration meeting user A is occluding himself with shared content 22, the visual feedback engine 28 may render (on user A's screen 12) the variably semi-transparent image 32 with a relatively low level of transparency. However, if user A moves the shared content 22 in response to seeing the variably semi-transparent image 32, the visual feedback engine 28 may render an updated variably semi-transparent image 32 (based upon an updated composite image 18 or 18' or an update image 20 of user A) with a higher level of transparency than when the content 22 was occluded user A.

Referring now specifically to FIG. 4A, a front view of the screen 12 is depicted when a composite image 18" and content 22 shared by user A (from FIG. 1) are displayed thereon. This composite image 18" is generated using an image (e.g., of user B and the background surrounding her within the field of view of the imaging device 14') from imaging device 14', which is mirrored and composited with any content shared by user B (which, in this example, is nothing). In this example, the variably semi-transparent image 32 is based upon the portion of the image 20 of user A that is being occluded by the content 22. The variably semi-transparent image 32 is overlaid on the content 22 that user A is sharing. Overlaying the variably semi-transparent image 32 on the content 22 gives the content 22 a reflective appearance, at least in part because the user's own image is displayed back at him/her. In other words, the shared content 22 is used like a mirror that reflects a semi-transparent variation of the portion of the image 20 that is being occluded so that the local user can see himself or herself, and see whether he/she is being occluded by the content 22 that he/she is sharing.

Referring now specifically to FIG. 4B, a front view of the screen 12 is depicted when the composite image 18" and content 22 shared by user A (from FIG. 1) are displayed thereon. In this example, the variably semi-transparent image 32 is based upon the composite image 18 or 18'. The variably semi-transparent image 32 is displayed in a window 34 that is overlaid on a portion of the composite image 18". It is to be understood that the window 34 and the variably semi-transparent image 32 therein may be overlaid on any portion of the composite image 18", on the entire composite image 18", and/or on the shared content 22. When the variably semi-transparent image 32 is displayed in the window 34, it is to be understood that altering the transparency of the variably semi-transparent image 32 will simultaneously alter the transparency of the window 34.

In the foregoing discussion, various components have been described as combinations of hardware and programming. These components may be implemented in a variety of fashions. FIG. 5 illustrates one example of the implementation of these components. In this example, the remote collaboration system is labeled 100 and includes sub-system A, generally labeled SSA, and sub-system B, generally labeled SSB. The respective sub-systems SSA and SSB each include the respective see-through screen 12, 12', the respective imaging device 14, 14', the respective projector 16, 16', and a respective computing device 36, 36' to which the respective components 12, 14, 16 or 12', 14' 16' are operatively connected. The computing devices 36, 36' are connected via a link 26, similar to the link 26 previously described in reference to FIG. 1. While the system 100 shown in FIG. 5 includes projector-based displays and see-through screens, it is to be understood that any other type of hardware components may be used (e.g., non-projector-based displays and non-see-through screens).

The computing devices 36, 36' may be any personal computer, portable computer (e.g., laptop 11), content server, a network PC, a personal digital assistant (PDA), a cellular telephone or any other computing device that is capable of performing the functions for receiving input from and/or providing control or driving output to the various devices (e.g., 12, 12', 12", 14, 14', 16, 16', etc.) associated with the respective sub-systems SSA, SSB of the remote collaboration system(s), e.g., 100, disclosed herein.

In the example shown in FIG. 5, the programming may be processor executable instructions stored on non-transitory, tangible memory media 38, 38', and the hardware may include a processor 40, 40' for executing those instructions. In an example, the memory 38, 38' of the respective sub-systems SSA, SSB store program instructions that when executed by respective processors 40, 40' implement image processing engine 30 of FIG. 3 (using images and shared content from the appropriate sub-systems SSA or SSB). The memory 38, 38' may be integrated in the same device as the respective processors 40, 40', or they may be separate from, but accessible to, the respective computing device 36, 36' and processor 40, 40'.

In an example, the program instructions may be part of an installation package that can be executed by the respective processors 40, 40' to implement the image processing engine 30 of FIG. 3. In these instances, the memory 38, 38' may be a portable medium, such as a compact disc (CD), a digital video disc (DVD), or a flash drive, or the memory 38, 38' may be a memory maintained by a server from which the installation package can be downloaded and installed on the respective computing systems 36, 36'. In another example, the program instructions may be part of an application or applications already installed on the respective computing systems 36, 36'. In this other example, the memory 38, 38' may include integrated memory, such as a hard drive.

FIG. 6 illustrates another example of the programming and the hardware that may be used. As shown in FIG. 6, the executable program instructions stored in the memory 38, 38' are depicted as a compositing module 42 and a visual feedback module 44. The compositing module 42 represents program instructions that when executed cause the implementation of the compositing engine 24 or 24' of FIG. 3. Similarly, the visual feedback module 44 represents program instructions that when executed cause the implementation of the visual feedback engine 28 of FIG. 3.

Figure 7:
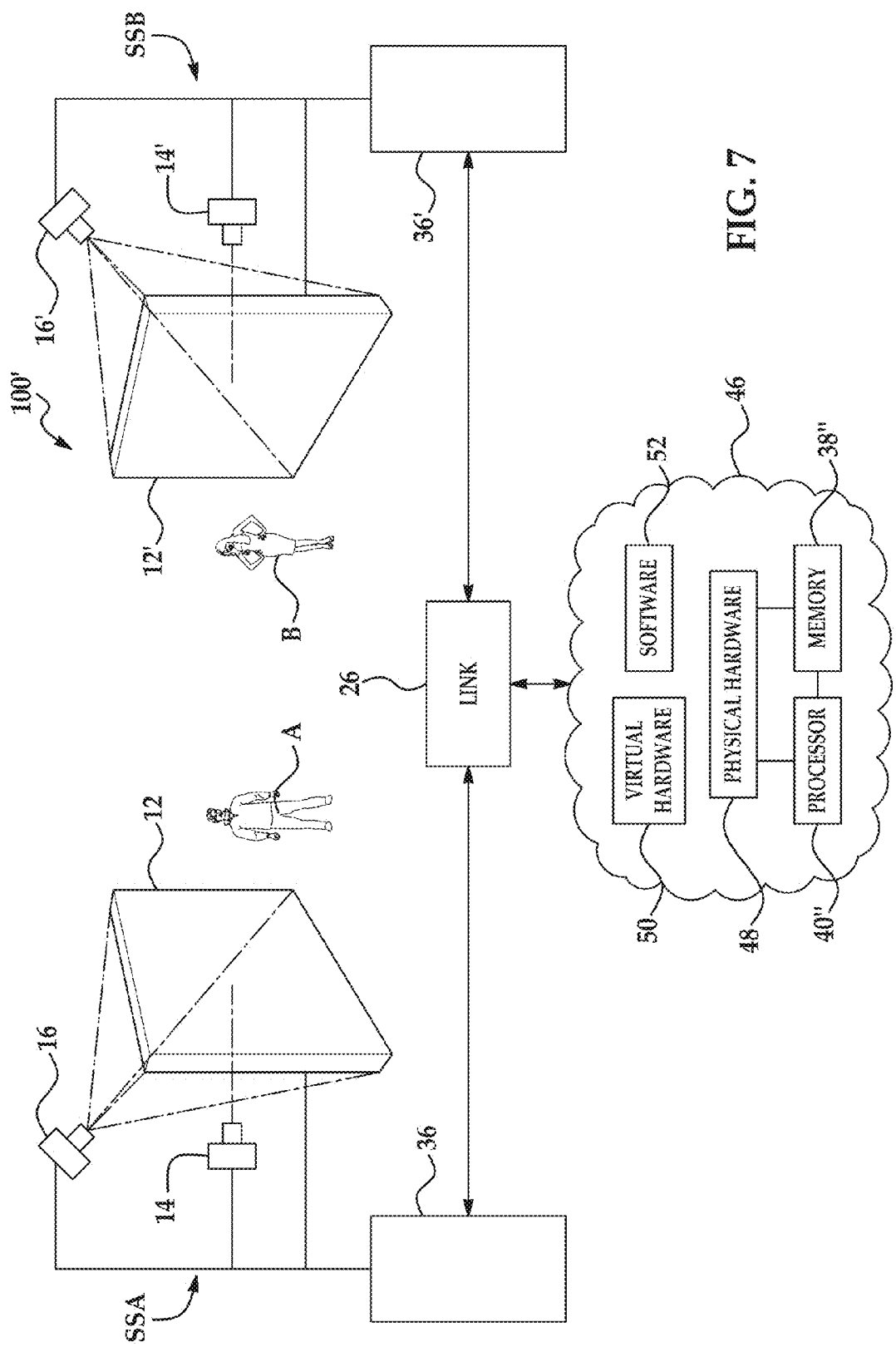
FIG. 7 is a semi-schematic view of an example of a remote collaboration system where an image processing system is part of a cloud computing system.

Referring now to FIG. 7, another example of the remote collaboration system 100' is depicted. In this example, the remote collaboration system 100' includes sub-system A, SSA, and sub-system B, SSB. The respective sub-systems SSA and SSB each include the respective see-through screen 12, 12', the respective imaging device 14, 14', the respective projector 16, 16', and a respective computing device 36, 36' to which the respective components 12, 14, 16 or 12', 14' 16' are operatively connected. In this example, however, the computing devices 36, 36' are operatively connected to each other and to a cloud computing system 46 via the link 26. While the system 100' shown in FIG. 7 includes projector-based displays and see-through screens, it is to be understood that any other type of hardware components may be used (e.g., non-projector-based displays and non-see-through screens).

As used herein, the cloud computing system 46 refers to a computing system including multiple pieces of hardware operatively coupled over a network so that they can perform a specific computing task. The cloud 46 includes a combination of physical hardware 48, software 52, and virtual hardware 50. The cloud computing system 46 is configured to (i) receive requests from the computing devices 36, 36' (or from users A and/or B using computing devices 36, 36'), and (ii) return request responses. As examples, the cloud computing system 46 may be a private cloud, a public cloud or a hybrid cloud. Further, the cloud 46 may be a combination cloud computing system including a private cloud (or multiple private clouds) and a public cloud (or multiple public clouds).

The physical hardware 48 may include, among others, processors, memory devices, and networking equipment. The virtual hardware 50 is a type of software that is processed by the physical hardware 48 and designed to emulate specific hardware. As an example, virtual hardware 50 may include a virtual machine (VM), i.e., a software implementation of a computer that supports execution of an application like a physical machine. An application, as used herein, refers to a set of specific instructions executable by a computing system for facilitating carrying out a specific task. For example, an application may take the form of a web-based tool providing users A, B with a specific functionality, e.g., running a remote collaboration meeting. It will be understood that an application as used herein is not limited to a remote collaboration application but refers to an application supporting performing a specific task using computing resources such as, among others, enterprise applications, accounting applications, multimedia related applications, or data storage applications. Software 52 is a set of instructions and data configured to cause virtual hardware 50 to execute an application. As such, the cloud computing system 46 can render a particular application available to users A and B.

Executing an application in the cloud 46 may involve receiving a number of requests (e.g., request to generate a variably semi-transparent image 32), processing the requests according to the particular functionality implemented by the application (e.g., generating the variably semi-transparent image 32), and returning request responses (e.g., transmitting the variably semi-transparent image 32 to the requesting computing system 36 or 36'). For executing the application, the resources (e.g., physical hardware 48, virtual hardware 50, and software 52) of the cloud computing system 46 may be scaled depending on the demands posed on the application. For example, cloud 46 may vary the size of the resources allocated to the application depending on the number of requests, the number of users or sub-systems SSA, SSB interacting with the application, or requirement on the performance of the application (e.g., a maximum response time). While not shown, it is to be understood that the cloud 46 may also include an interface that allows the computing devices 36, 36' to communicate with the components of the cloud 46.

In the example of FIG. 7, the hardware 50 of the cloud computing system 46 may include a processor 40" and a memory 38". The processor 40" may be any processor that is capable of executing program instructions stored in the memory 38" to perform, for example, image compositing and visual feedback. The memory 38" may include an operating system and applications, such as a compositing application and a visual feedback application. The operating system may be a collection of programs that, when executed by the processor 40", serve as a platform on which the compositing application and the visual feedback application can run. Examples of operating systems include, for example, various versions of Linux® and Microsoft's Windows®.

The compositing application represents program instructions that, when executed by the processor 40", function as a service that causes i) recognition of content 22 being projected while an image 20 is being captured via the requesting sub-systems SSA, SSB, ii) generation of the composite image 18, 18', 18" for the requesting sub-system SSA, SSB, and iii) transmission of the composite image 18, 18', 18" to the other of the sub-systems SSB, SSA for display. The compositing application represents program instructions that, when executed by the processor 40", function as a service that causes i) generation of the variably semi-transparent image 32 of at least a portion of the composite image 18 for the requesting sub-system SSA, SSB, and ii) transmission of the variably semi-transparent image 32 to the requesting sub-system SSA, SSB for display.

In the cloud computing system 46 of FIG. 7, the image processing system 30 of FIG. 3 may have the hardware portions implemented as the processor 40" and may have the programming portions implemented as the operating system and applications. In this example then, each of the computing devices 36, 36' may utilize the services of the cloud to achieve remote collaboration, and in particular to provide visual feedback to the respective local users.

The figures set forth herein aid in depicting various architectures, functionalities, and operations of the examples disclosed herein. Throughout the description, many of the components are defined, at least in part, as programs, programming, or program instructions. Each of these components, portions thereof, or various combinations thereof may represent in whole or in part a module, segment, or portion of code that includes one or more executable instructions to implement any specified logical function(s). Each component or various combinations thereof may represent a circuit or a number of interconnected circuits to implement the specified logical function(s).

The examples disclosed herein may be realized in any non-transitory, tangible computer-readable media for use by or in connection with an instruction execution system (e.g., computing systems 36, 36'), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing systems 36, 36'. Computer readable media may include any one of many physical media such as, for example, electronic, magnetic, optical, electromagnetic, or semiconductor media. More specific examples of suitable computer-readable media include a portable magnetic computer diskette such as floppy diskettes or hard drives, a random access memory (RAM), a read-only memory (ROM), an erasable programmable read-only memory, or a portable CD, DVD, or flash drive.

While several examples have been described in detail, it will be apparent to those skilled in the art that the disclosed examples may be modified. Therefore, the foregoing description is to be considered non-limiting.

What is claimed is:

1. A method comprising:
recognizing that content is being shared on a local screen while an image is being captured at a location of the local screen;
generating a first composite image including a form of the image and the shared content;
causing the first composite image to be displayed on a remote screen, wherein in the first composite image, the shared content is occluding an object such that a remote user cannot see all or a portion of the object;
displaying a second composite image on the local screen, the second composite image including at least a second image captured at a different location of the remote screen and being received from a sub-system associated with the remote screen;
recognizing in response to a determination, by a visual feedback engine, that the shared content is occluding the object in the first composite image;
generating, by the visual feedback engine, a variably semi-transparent image of at least a portion of the image including the object that is being occluded by the shared content; and
overlaying the variably semi-transparent image on the shared content on the local screen, thereby providing a local user with visual feedback as to how the shared content is occluding the object in the first composite image, the variably semi-transparent image overlaid on the shared content being provided within only a portion of the second composite image, the portion of the second composite image being smaller than the second composite image.

2. The method as defined in claim 1, further comprising:
dynamically and automatically causing a level of transparency of the variably semi-transparent image to vary based upon the object that is being occluded by the shared content.

3. The method as defined in claim 2, wherein the dynamically and automatically causing includes causing the level of transparency to be lower when the object is the local user.

4. The method as defined in claim 1, wherein providing the variably semi-transparent image is accomplished by causing the variably semi-transparent image to be displayed in a window that is overlaid on the shared content.

5. The method as defined in claim 1, further comprising causing the variably semi-transparent image to exhibit a level of transparency that corresponds with a local user-selected transparency level setting.

6. The method as defined in claim 1, wherein the generating of the variably semi-transparent image is accomplished using alpha compositing.

7. A non-transitory computer readable medium having instructions that when executed implement a method for providing visual feedback to a local user of a remote collaboration system, the method comprising:

recognizing that content is being shared on a local screen while an image is being captured at a location of the local screen;

generating a first composite image including the image being captured and the shared content;

causing the first composite image to be displayed on a remote screen, wherein in the first composite image, the shared content is occluding an object such that a remote user cannot see all or a portion of the object;

displaying a second composite image on the local screen, the second composite image including at least a second image captured at a different location of the remote screen and being received from a sub-system associated with the remote screen;

recognizing in response to a determination, by a visual feedback engine, that the shared content is occluding the object in the first composite image;

generating, by the visual feedback engine, a variably semi-transparent image of at least a portion of the image including the object that is being occluded by the shared content; and overlaying the variably semi-transparent image on the shared content on the local screen, thereby providing the local user with visual feedback as to how the shared content is occluding the object in the first composite image displayed on the remote screen, the variably semi-transparent image overlaid on the shared content being provided within only a portion of the second composite image displayed on the local screen, the portion of the second composite image being smaller than the second composite image displayed on the local screen.

8. The non-transitory computer readable medium as defined in claim 7, wherein the method further comprises:
dynamically and automatically causing a level of transparency of the variably semi-transparent image to vary based upon the object that is being occluded by the shared content.

9. The non-transitory computer readable medium as defined in claim 8, wherein the dynamically and automatically causing includes causing the level of transparency to be lower when the object is the local user.

10. The non-transitory computer readable medium as defined in claim 7, wherein providing the variably semi-transparent image includes causing the variably semi-transparent image to be displayed in a window that is overlaid on the shared content.

11. The non-transitory computer readable medium as defined in claim 7, wherein the rendering of the variably semi-transparent image includes causing the variably semi-transparent image to exhibit a level of transparency that corresponds with a local user-selected transparency level setting.

12. A system for providing visual feedback to a local user of a remote collaboration system, the system comprising:
a processor;
a local screen to receive and display a composite image from a sub-system associated with a remote screen of the remote collaboration system, the composite image including an image captured at a location of the remote screen;
a compositing engine, including a machine-readable storage medium storing instructions, the instructions executable by the processor and stored on a non-transitory, tangible memory medium, to:
recognize that content is being shared on a local screen while a second an image including an object is being captured at a different location of the local screen;
generate a second composite image including a form of the second image being captured and the shared content; and
cause the composite image to be displayed on a remote screen, wherein in the composite image, the shared content is occluding the object such that a remote user cannot see all or a portion of the object;
the remote screen to display the second composite image; and
a visual feedback engine, including instructions executable by the processor and stored on the non-transitory, tangible memory medium or on another non-transitory, tangible memory medium, to:
recognize in response to a determination that the shared content is occluding the object in the composite image;
generate a variably semi-transparent image of at least a portion of the second image including the object that is being occluded by the shared content; and
overlay the variably semi-transparent image on the shared content on the local screen such that visual feedback is provided to the local user as to how the shared content is occluding the object in the second composite image displayed on the remote screen, the variably semitransparent image overlaid on the shared content being provided within only a portion of the composite image displayed on the local screen, the portion of the composite image being smaller than the composite image displayed on the local screen.

13. The system as defined in claim 12, wherein the instructions are executable to:
dynamically and automatically cause a level of transparency of the variably semi-transparent image to vary based upon the type of object that is being occluded by the shared content.

14. The system as defined in claim 12, wherein the variably semi-transparent image is displayed in a window that is overlaid on the shared content.

15. The system as defined in claim 12, wherein the instructions are executable to cause the variably semi-transparent image to have a level of transparency that corresponds with a local user-selected transparency level setting.

16. The system as defined in claim 12, further comprising:
a local screen to receive and display a second composite image from a sub-system associated with the remote screen of the remote collaboration system, the second composite image including a second image captured at a different location of the remote screen.

17. The system as defined in claim 12, wherein the instructions are executable to, in response to a determination that the object is the local user, reduce the level of transparency of the variably semi-transparent image.

18. The system as defined in claim 12, wherein the instructions are executable to, in response to a determination that the object is not the local user, increase the level of transparency of the variably semi-transparent image.

19. The system as defined in claim 12, wherein the object is the local user, and wherein the instructions are executable to control the level of transparency of the variably semi-transparent image based on a body part of the local user that is being occluded by the shared content.

20. The system as defined in claim 12, wherein the object is the local user, and wherein the instructions are executable to control the level of transparency of the variably semi-transparent image based on how much of the local user is being occluded by the shared content.

* * * * *